Figure 1:
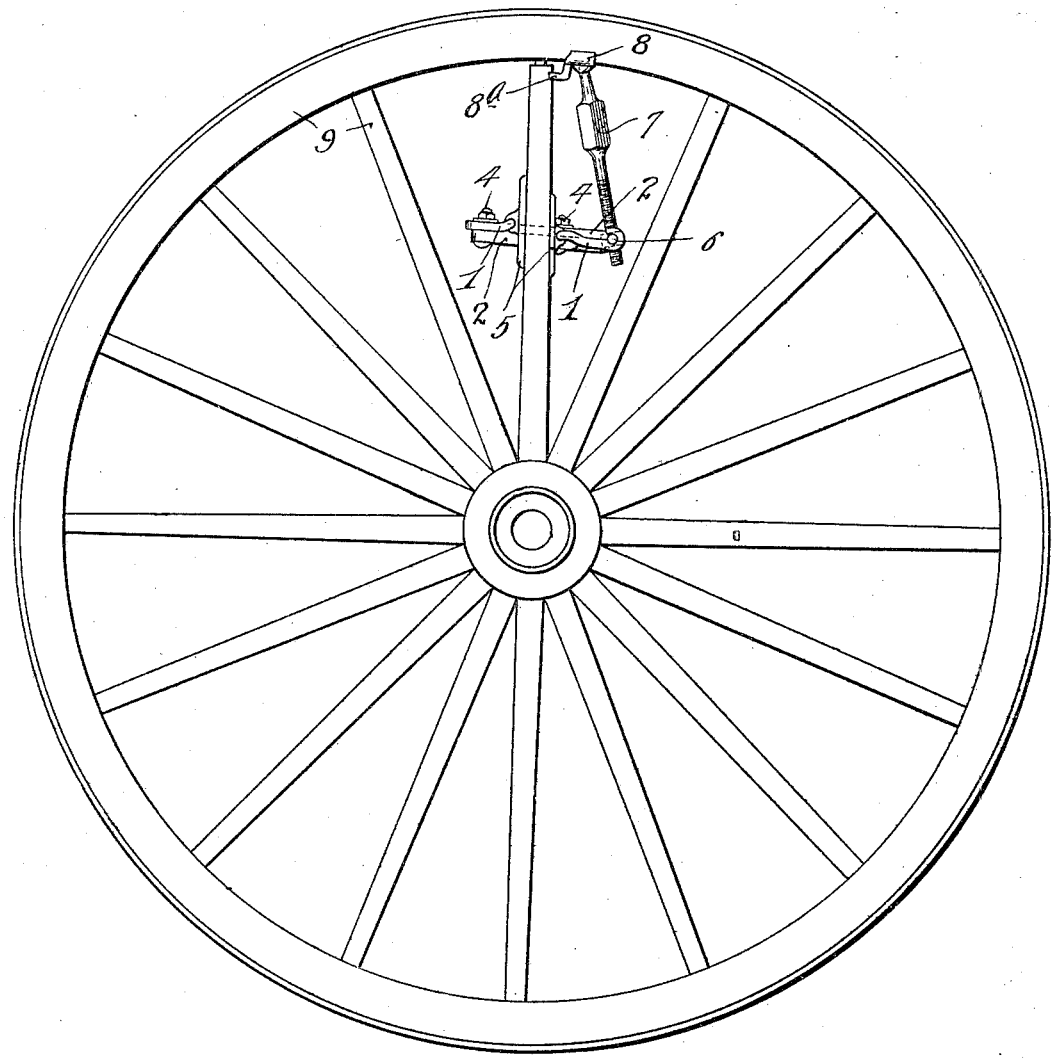

No. 689,022. Patented Dec. 17, 1901.
F. E. REW & W. J. McREADY.
SPOKE AND TIRE TIGHTENER.
(Application filed May 13, 1901.)

(No Model.) 2 Sheets—Sheet 1.

No. 689,022. Patented Dec. 17, 1901.
F. E. REW & W. J. McREADY.
SPOKE AND TIRE TIGHTENER.
(Application filed May 13, 1901.)
(No Model.) 2 Sheets—Sheet 2.
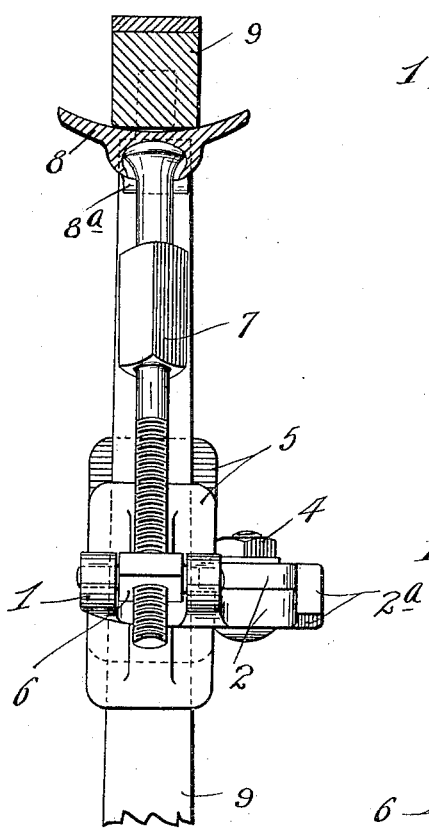
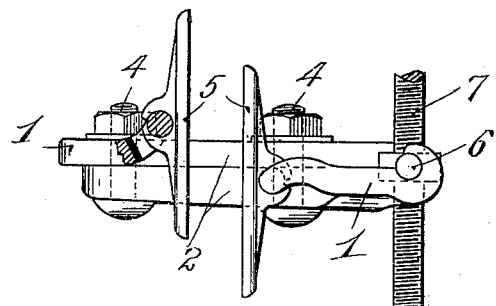
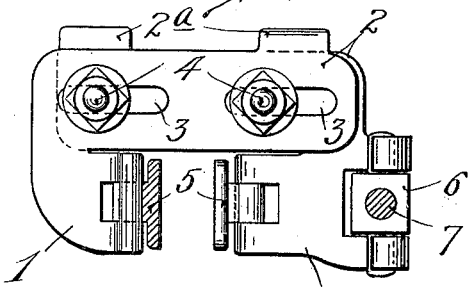
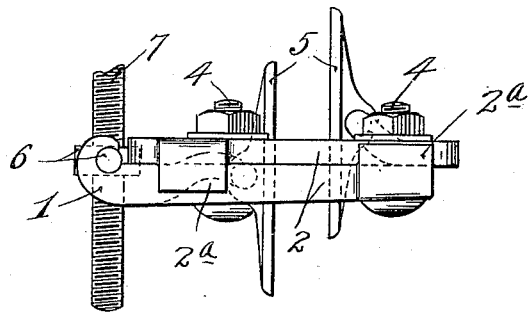
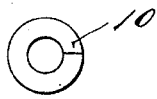
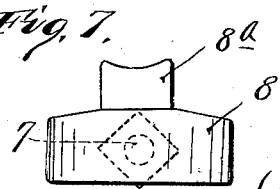
Witnesses,
Harry Kilgore
Robert Otto.
Inventors,
Frances E. Rew,
William J. McReady,
By their Attorneys,
Williamson Merchant

UNITED STATES PATENT OFFICE.

FRANCIS E. REW, OF BEDERWOOD, AND WILLIAM J. McREADY, OF FRIDLEY, MINNESOTA.

SPOKE AND TIRE TIGHTENER.

SPECIFICATION forming part of Letters Patent No. 689,022, dated December 17, 1901.

Application filed May 13, 1901. Serial No. 60,101. (No model.)

*To all whom it may concern:*

Be it known that we, FRANCIS E. REW, of Bederwood, Hennepin county, and WILLIAM J. MCREADY, of Fridley, Anoka county, Minnesota, citizens of the United States, have invented certain new and useful Improvements in Spoke and Tire Tighteners; and we do hereby declare the following to be a full, clear, and exact description of the invention, such as will enable others skilled in the art to which it appertains to make and use the same.

Our invention has for its object to provide an improved tire-tightener capable of use for springing the tire and the felly of a wheel in respect to a spoke for the admission of a split ring between the spoke and the felly to maintain the tire in tightened position.

To this end our invention consists of the novel devices and combinations of devices hereinafter described, and defined in the claims.

The invention is illustrated in the accompanying drawings, wherein, like notations referring to like parts throughout the several views—

Figure 1 is a view in elevation, showing our device in working position. Fig. 2 is a view showing the wheel in section and the device in elevation in the plane of the wheel, some parts being in section and others broken away. Fig. 3 is a view showing the clamp in side elevation detached. Fig. 4 is a plan view of the device detached, with some parts shown in horizontal section. Fig. 5 is an elevation similar to Fig. 3, but looking from the opposite side. Fig. 6 is a detail showing one of the tightening-rings detached, and Fig. 7 is a detail showing the socket-plate for use at the top of the jack-screw and a stop-lug integral therewith.

The characteristic feature of this invention is the provision of an automatic clamp securable to a wheel-spoke under the reaction from the jack-screw when the parts are in working position. The clamp is made up of a pair of bed-plates 1, having lap extensions 2, provided with longitudinal slots 3 for cooperation with the nutted bolts 4 to hold the said base-plates in any desired adjustment in respect to each other. The said lap-plates 2 are provided with interlocking lugs 2ª, the lug of one plate being turned down and the other turned up for interlocking engagement each with an opposite plate, as best shown in Figs. 4 and 5. The lap extensions 2 of the bed-plates 1 are at one side of the bed made up by said base-plates 1 to afford space for the attachment of the clamping-jaws 5, which are pivoted each to one of the plates, as best shown in Figs. 3, 4, and 5. One of the bed-plates is also provided with a trunnioned nut 6, secured thereto by said trunnions with freedom for pivotal motion, as best shown in Fig. 4. The screw-threaded end of the jack-screw 7 engages with the pivoted nut 6, and the upper or ball end of the screw engages with the socket-block 8, having a concave face for application to the felly of the wheel. The socket-block 8 is provided with an angular lug 8ª, projecting therefrom and having a concave face for engagement with one of the spokes of the wheel, as shown in Fig. 1. The pivotal bearings for the clamping-plates 5 are staggered with respect to each other in the vertical plane, so that the plates 5 do not center directly in opposite positions, but at points offset from each other in a vertical plane.

With this construction of the parts the application and operation are as follows: The bed-plates 1 of the clamp may be set relative to each other once for all, so far as spokes of near a given size are concerned. For spokes of widely-different diameter or, in other words, for wheels of largely-different size or having spokes of different shape it may be necessary to adjust the bed-plates 1 of the clamp in respect to each other. The said bed-plates having been set, however, for a given type of spoke or wheel, the clamp becomes automatic in its action under the reaction from the jack-screw 7. Otherwise stated, the bed-plates 1 are so set that the pivoted jaws 5 will readily embrace any spoke of the given type of wheel, and when the jack-screw is applied in working position with the socket-block 8 bearing against the under surface of the wheel-felly the manipulation of the jack-screw for the tightening or spreading action will tilt the clamp into an angular position in respect to the wheel-spoke, and thereby cause the pivoted jaws 5 of the clamp to firmly grasp the spoke and tighten thereon under a cramping action. Hence the clamp will tightly hold its position on the spoke and serve as the base of reaction for the jack-screw 7. By then further manipulating the jack-screw the felly and tire of the wheel 9 may be sprung outward in respect to the spoke and the hub, and thereby afford an opening which will permit a split ring 10 to be slipped into position around the tenon of the spoke for permanently holding the felly and the tire in their sprung or tire-tightening position. The tightener is thus applied in succession to as many of the spokes as may be desirable or necessary to bring the tire to a proper tension.

It must be obvious that this device is a great improvement over ordinary tighteners, wherein the clamp must first be set and secured by clamping-screws to the spoke before the jack-screw can be brought into action. It must be obvious that with this improved device the speed of the work can be greatly increased. As a matter of fact, usage shows that nearly twice the same work can be done in any given time as compared with the old tightening devices. The fact that the nut 6 is pivoted to the base-plate of the clamp permits the jack-screw to take any desired angular adjustment, and this possible adjustment of the jack-screw makes it unnecessary to have the clamp tighten to the spoke at any exact predetermined distance from the felly of the wheel. Hence it further follows that the clamp is capable of being applied to spokes differing considerably in size without requiring any readjustment of the bed-plates 1 in respect to each other.

The purpose of the angular lug $8^a$ on the socket-block 8 is to serve as a stop to prevent slipping of the socket-plate on the felly when in working position. The stop-lug $8^a$ limits the angular motion of the jack-screw toward the spoke at the upper end of the screw, thereby insuring sufficient clearance for the application of the washer or split ring 10 without interference from the socket-plate 8 of the jack-screw.

It will be understood that the construction can be changed in detail without departing from the spirit of our invention.

What we claim, and desire to secure by Letters Patent of the United States, is as follows:

1. In a tire-tightener, the combination with a clamp having a base-plate and a pair of hinged or pivotally-connected jaws, of a jack-screw directly hinged or pivoted to said base-plate for angular movements with respect thereto and to said jaws, substantially as described.

2. In a tire-tightener, the combination with a clamp having base-plates with lap extensions, adjustable in respect to each other to space the opening between the jaws of the clamp, of means for securing said lap-sections in their set adjustments, and a jack-screw pivoted to one of the base-plates at a point offset from the jaws, substantially as and for the purposes set forth.

3. The combination with a clamp composed of the base-plates 1 having the lap extensions 2 with slot-and-bolt connections, as described, and provided with interlocking lugs $2^a$, the jaws 5 pivoted thereto, and staggered in respect to each other in the vertical plane, in combination with the pivoted nut 6, the jack-screw 7, the socket-plate 8 and the socket-lug $8^a$, for coöperation, substantially as described.

In testimony whereof we affix our signatures in presence of two witnesses.

FRANCIS E. REW.
WILLIAM J. McREADY.

Witnesses:
ELIZABETH KELEHER,
F. D. MERCHANT.